United States Patent
Zhu

(10) Patent No.: US 9,906,776 B2
(45) Date of Patent: Feb. 27, 2018

(54) DISPLAY CONTROL METHOD, DEVICE AND SYSTEM

(71) Applicant: BOE TECHNOLOGY GROUP CO., LTD., Beijing (CN)

(72) Inventor: Jinye Zhu, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 131 days.

(21) Appl. No.: 14/436,022

(22) PCT Filed: Oct. 29, 2014

(86) PCT No.: PCT/CN2014/089806
§ 371 (c)(1),
(2) Date: Apr. 15, 2015

(87) PCT Pub. No.: WO2015/180402
PCT Pub. Date: Dec. 3, 2015

(65) Prior Publication Data
US 2016/0353086 A1    Dec. 1, 2016

(30) Foreign Application Priority Data
May 29, 2014    (CN) .......................... 2014 1 0235996

(51) Int. Cl.
*G06T 15/00*    (2011.01)
*H04N 13/04*    (2006.01)
(Continued)

(52) U.S. Cl.
CPC .............. *H04N 13/04* (2013.01); *G06F 3/013* (2013.01); *G06T 11/80* (2013.01); *G09G 5/00* (2013.01);
(Continued)

(58) Field of Classification Search
CPC ................................ G06T 19/00; G06T 17/20
(Continued)

(56) References Cited

U.S. PATENT DOCUMENTS

2003/0025995 A1 * 2/2003 Redert .............. H04N 13/0404
                                                        359/464
2007/0091638 A1 * 4/2007 Ijzerman .............. G02B 6/0041
                                                        362/611
(Continued)

FOREIGN PATENT DOCUMENTS

| CN | 1476730 A | 2/2004 |
|---|---|---|
| CN | 1875302 A | 12/2006 |

(Continued)

OTHER PUBLICATIONS

Sep. 30, 2015—(CN) Second Office Action for Appn 201410235996.4 with Eng Tran.
(Continued)

*Primary Examiner* — Jin Ge
(74) *Attorney, Agent, or Firm* — Banner & Witcoff, Ltd.

(57) ABSTRACT

A display control method, device and system are provided. The display control method comprises: displaying other sub-pixel views, except a 3D left-eye visual view and a 3D right-eye visual view, of a display module to be same 2D views; and obtaining corresponding 2D viewing position adjustment information capable of allowing both a left eye and a right eye of a 2D viewer to watch the 2D view according to eye position information of each 2D viewer, and outputting the 2D viewing position adjustment information. The proposal can achieve glasses-free 3D display and 2D display at the same time and satisfy the viewing requirements of different viewers at the same time.

7 Claims, 3 Drawing Sheets

---

101 — Displaying sub-pixel views, other than a 3D left-eye visual view and a 3D right-eye visual view, of a display module to be same 2D views 102 — Obtaining corresponding 2D viewing position adjustment information capable of allowing both a left eye and a right eye of a 2D viewer to view the 2D view according to eye position information of each 2D viewer, and outputting the 2D viewing position adjustment information

(51) Int. Cl.
 G06F 3/01 (2006.01)
 G06T 11/80 (2006.01)
 G09G 5/00 (2006.01)
(52) U.S. Cl.
 CPC ....... H04N 13/047 (2013.01); H04N 13/0409 (2013.01); H04N 13/0456 (2013.01); G06T 2200/04 (2013.01); H04N 2013/0461 (2013.01)
(58) Field of Classification Search
 USPC .......................................................... 345/419
 See application file for complete search history.

(56) References Cited

U.S. PATENT DOCUMENTS

| | | | | |
|---|---|---|---|---|
| 2011/0157168 | A1* | 6/2011 | Bennett | G06F 3/14 345/419 |
| 2011/0157697 | A1* | 6/2011 | Bennett | G06F 3/14 359/462 |
| 2011/0310233 | A1* | 12/2011 | Bathiche | H04N 13/0418 348/51 |
| 2011/0316881 | A1* | 12/2011 | Yoshifuji | H04N 13/0409 345/634 |
| 2012/0206503 | A1* | 8/2012 | Hirakata | H04N 13/0409 345/690 |
| 2013/0057159 | A1* | 3/2013 | Pijlman | G02B 27/2214 315/154 |

FOREIGN PATENT DOCUMENTS

| | | |
|---|---|---|
| CN | 101126840 A | 2/2008 |
| CN | 201260216 Y | 6/2009 |
| CN | 101616334 A | 12/2009 |
| CN | 102183841 A | 9/2011 |
| CN | 102316341 A | 1/2012 |
| CN | 103247246 A | 8/2013 |
| CN | 104023223 A | 9/2014 |

OTHER PUBLICATIONS

Jan. 22, 2016—(CN) Notice of Allowance for Appn 201410235996.4 with Eng Tran.
Feb. 5, 2015—International Search Report and Written Opinion with Eng Tran.
Jun. 17, 2015—(CN)—First Office Action for Appn 201410235996.4 with Eng Tran.

* cited by examiner

DISPLAY CONTROL METHOD, DEVICE AND SYSTEM

The application is a U.S. National Phase Entry of International Application No. PCT/CN2014/089806 filed on Oct. 29, 2014, designating the United States of America and claiming priority to Chinese Patent Application No. 201410235996.4 filed on May 29, 2014. The present application claims priority to and the benefit of the above-identified applications and the above-identified applications are incorporated by reference herein in their entirety.

TECHNICAL FIELD

At least one embodiment of the present invention relates to a display control method, device and system.

BACKGROUND

With the development of science and technology, 3D display, particularly glasses-free 3D display, has become an inevitable trend in the display field. The principle of the currently common glasses-free 3D display technology is as follows: dividing an image into two images adapted to be viewed by a left eye and a right eye from different angles, and present a plurality of mutually spaced left visual fields and right visual fields in front of a display panel with the help of a grating. When a left eye of a viewer is disposed in the left visual field and a right eye is disposed in the right visual field corresponding to the left visual field, the left eye of the viewer can view the corresponding left-eye image and the right eye can view the corresponding right-eye image. The left-eye image and the right-eye image are a pair of stereo images. Thus, the brain can integrate the images into a 3D image, and hence the viewer can enjoy the 3D stereo image.

SUMMARY

At least one embodiment of the present invention provides a display control method, device and system, which can achieve glasses-free 3D display and 2D display at the same time, satisfy the viewing requirements of different viewers at the same time, and improve the applicability of a display module.

At least one embodiment of the present invention provides a display control method, which comprises: allowing sub-pixel views, other than a 3D left-eye visual view and a 3D right-eye visual view, of a display module to display a same 2D view; and obtaining corresponding 2D viewing position adjustment information capable of allowing both a left eye and a right eye of a 2D viewer to watch the 2D view according to eye position information of each 2D viewer, and outputting the 2D viewing position adjustment information.

At least one embodiment of the present invention further provides a display control device, which comprises: a display control module configured to allow sub-pixel views, other than a 3D left-eye visual view and a 3D right-eye visual view, of a display module to display a same 2D view; and a first computing module configured to obtain corresponding 2D viewing position adjustment information capable of allowing both a left eye and a right eye of a 2D viewer to watch the 2D view according to eye position information of each 2D viewer and output the 2D viewing position adjustment information.

At least one embodiment of the present invention further provides a display control system, which comprises: a display module; a liquid crystal grating module disposed in front of the display module; a signal receiving module configured to receive view type selection signals of viewers; a human eye sensing module configured to detect human eye position information; and a control module being in signal connection with the display module, the liquid crystal grating module, the signal receiving module and the human eye sensing module respectively and configured to allow sub-pixel views, other than a 3D left-eye visual view and a 3D right-eye visual view, of the display module to display a same 2D view, and obtain corresponding 2D viewing position adjustment information capable of allowing both a left eye and a right eye of a 2D viewer to watch the 2D view according to eye position information of each 2D viewer and output the 2D viewing position adjustment information.

BRIEF DESCRIPTION OF THE DRAWINGS

Simple description will be given below to the accompanying drawings of the embodiments to provide a more clear understanding of the technical proposals of the embodiments of the present invention. Obviously, the drawings described below only involve some embodiments of the present invention but are not intended to limit the present invention.

DETAILED DESCRIPTION

For more clear understanding of the objectives, technical proposals and advantages of the embodiments of the present invention, clear and complete description will be given below to the technical proposals of the embodiments of the present invention with reference to the accompanying drawings of the embodiments of the present invention. Obviously, the preferred embodiments are only partial embodiments of the present invention but not all the embodiments. All the other embodiments obtained by those skilled in the art without creative efforts on the basis of the embodiments of the present invention illustrated shall fall within the scope of protection of the present invention.

Figure 1:
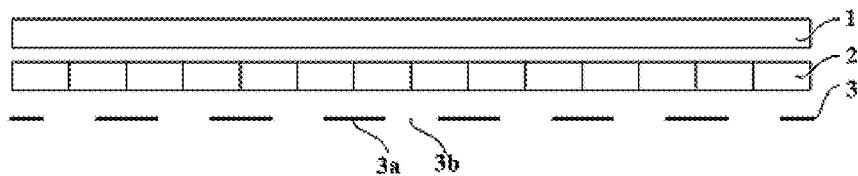
FIG. 1 is a schematic structural view of a 3D display device.

FIG. 1 is a schematic structural view of a 3D display device. As illustrated in FIG. 1, the 3D display device may comprise a backlight 1, a display panel 2 and a liquid crystal grating device 3. The display panel 2 includes left-eye sub-pixels for providing a left-eye view and right-eye sub-pixels for providing a right-eye view. The liquid crystal grating device 3 is an optical device including light shield areas 3a and light transmission areas 3b that are periodically and alternately arranged. The basic principle of the display device is that: the backlight 1 is configured to provide backlight for the display panel 2; light emitted from the left-eye sub-pixels and the right-eye sub-pixels of the display panel 2 is incident into different visual fields from the light transmission areas 3b of the liquid crystal grating device 3; the left eye and the right eye of a viewer fall into different visual fields; and hence the stereo perception can be produced.

The inventor of the application has noted that: a glasses-free 3D display device can switch between glasses-free 3D display and 2D display and the liquid crystal grating device of the glasses-free 3D display device is a liquid crystal shutter parallax barrier. The liquid crystal shutter parallax barrier is a twisted nematic (TN) liquid crystal display (LCD) panel. When the liquid crystal shutter parallax barrier is powered-on, periodically and alternately arranged light shield areas and light transmission areas are displayed, and, at this point, glasses-free 3D display can be achieved. When the liquid crystal shutter parallax barrier is powered-off, the entire liquid crystal shutter parallax barrier becomes transparent, and hence 2D display can be achieved. However, the glasses-free 3D display device cannot realize glasses-free 3D display and 2D display at the same time, namely a viewer can either view 3D display or view 2D display. If there are kinds of viewers having two different requirements, the requirements cannot be satisfied at the same time. Therefore, the glasses-free 3D display device has narrow range of application.

In order to achieve glasses-free 3D display and 2D display at the same time, satisfy the viewing requirements of different viewers and increase the applicability of the display module, at least one embodiment of the present invention provides a display control method, device and system. In the embodiment of the present invention, sub-pixel views, other than a 3D left-eye visual view and a 3D right-eye visual view, of the display module acts to display a same 2D view. The 2D viewing position adjustment information can guide a 2D viewer to move to a preferred 2D viewing position. Thus, glasses-free 3D display and 2D display can be achieved at the same time; the viewing requirements of different viewers can be satisfied at the same time; and the applicability of the display module can be widened.

For more clear understanding of the objectives, technical proposals and advantages of the present invention, further detailed description will be given below to the present invention with reference to the embodiments.

Figure 2:
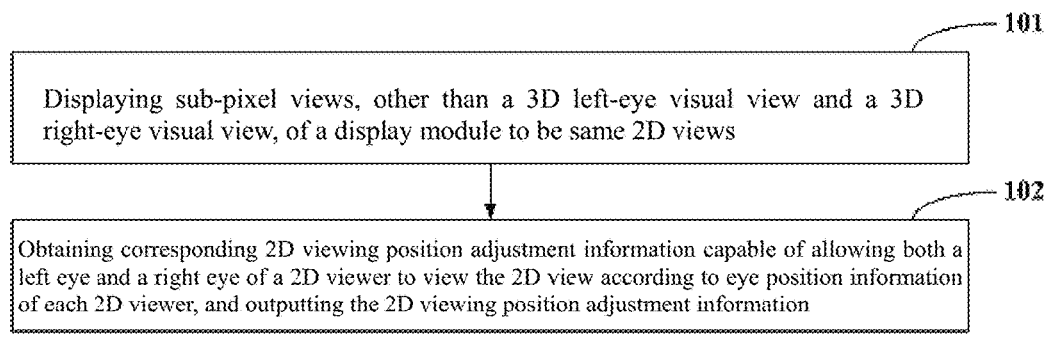
FIG. 2 is a flowchart of a display control method provided by an embodiment of the present invention.

As illustrated in FIG. 2, the display control method provided by at least one embodiment of the present invention comprises step 101 and step 102. The two steps will be described below in detail.

Step 101: allowing sub-pixel views, other than a 3D left-eye visual view and a 3D right-eye visual view, of a display module to present a same 2D views.

Step 102: obtaining corresponding 2D viewing position adjustment information capable of allowing both a left eye and a right eye of a 2D viewer to watch the 2D view according to eye position information of each 2D viewer, and outputting the 2D viewing position adjustment information.

The 3D left-eye visual view and the 3D right-eye visual view are views which can be respectively viewed by a left eye and a right eye of a primary viewer and produce 3D effect. In the glasses-free 3D display device capable of switching between glasses-free 3D display and 2D display, regularly arranged left-eye views and right-eye views are displayed by the display module; views undesirable to be viewed are shielded by light shield areas of a grating; and the viewer can view a preferred 3D view when being disposed at a specific viewing position. If the viewer wants to view a 2D view, the liquid crystal grating module is powered-off, and at this point, the entire liquid crystal grating module is transparent, and hence 2D display can be achieved. Obviously, the glasses-free 3D display device cannot achieve glasses-free 3D display and 2D display at the same time. In the technical proposal of the embodiment of the present invention, views other than the 3D left-eye visual view and the 3D right-eye visual view are used to present same 2D views. That is to say, views other than the 3D left-eye visual view and the 3D right-eye visual view are combined into a 2D visual view, and the 2D viewer can watch the 2D view when being guided by the 2D viewing position adjustment information to move to a preferred 2D viewing position. Therefore, the embodiment of the present invention can achieve glasses-free 3D display and 2D display at the same time, satisfy the viewing requirements of different viewers at the same times, and greatly improve the applicability of the display module.

The 2D view and the 3D left-eye visual view or the 3D right-eye visual view may display same image, so that the 2D viewer and the 3D viewer can view images having the same content. It should be noted that the 2D view may also display different images from both the 3D left-eye visual view and the 3D right-eye visual view. In this case, the 2D viewer and the 3D viewer can respectively view images having different contents.

In one embodiment, the method may further comprise: determining a primary 3D viewer who is the nearest to the screen center according to eye position information of at least one 3D viewer; and adjusting the position of a grating of a liquid crystal grating module according to the eye position information of the primary 3D viewer, so that a left eye and a right eye of the primary 3D viewer can respectively view a 3D left-eye visual view and a 3D right-eye visual view with maximum brightness. The primary 3D viewer can view the 3D view with maximum brightness without shifting position and hence can obtain better 3D visual effect.

In the method provided by the embodiment of the present invention, the number of viewers is not specifically limited. In one embodiment, when there are at least two 3D viewers, as for each secondary 3D viewer except the primary 3D viewer, the method may further comprise: obtaining corresponding 3D viewing position adjustment information capable of allowing a left eye and a right eye of the secondary 3D viewer to respectively watch the 3D left-eye visual view and the 3D right-eye visual view according to eye position information of the secondary 3D viewer, and outputting the 3D viewing position adjustment information. The 3D viewing position adjustment information can guide the secondary 3D viewer to rapidly move to a preferred 3D viewing position and hence obtain better 3D viewing effect.

In at least one embodiment, the 2D viewing position adjustment information may be: the minimum position adjustment distance from which both the left eye and the right eye of the 2D viewer can watch the 2D view. In at least one embodiment, the 3D viewing position adjustment information may be: the minimum position adjustment distance from which the left eye and the right eye of the secondary 3D viewer can respectively watch the 3D left-eye visual view and the 3D right-eye visual view. No matter the 2D viewer or the 3D viewer, the movement shall follow the principle of proximity, which is helpful for the improvement of the position adjustment efficiency. Thus, the display control is friendlier.

Figure 3:
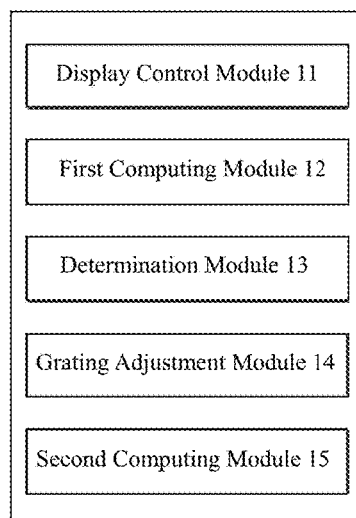
FIG. 3 is a flowchart of a display control device provided by an embodiment of the present invention.

As illustrated in FIG. 3, on the basis of the same invention concept, the display control device provided by at least one embodiment of the present invention comprises: a display control module 11 configured to allow sub-pixel views, other than a 3D left-eye visual view and a 3D right-eye visual view, of a display module to present same 2D views; and a first computing module 12 configured to obtain corresponding 2D viewing position adjustment information capable of allowing both a left eye and a right eye of a 2D viewer to watch the 2D view according to eye position information of each 2D viewer and output the 2D viewing position adjustment information.

In one embodiment, the display control device may further comprise: a determination module 13 configured to determine a primary 3D viewer who is the nearest to the screen center according to eye position information of at least one 3D viewer; and a grating adjustment module 14 configured to adjust a position of a grating of a liquid crystal grating module according to the eye position information of the primary 3D viewer, so that a left eye and a right eye of the primary 3D viewer can respectively watch the 3D left-eye visual view and the 3D right-eye visual view with maximum brightness.

In one embodiment, the display control device may further comprise: a second computing module 15 configured to obtain corresponding 3D viewing position adjustment information capable of allowing a left eye and a right eye of a secondary 3D viewer to respectively watch the 3D left-eye visual view and the 3D right-eye visual view according to eye position information of the secondary 3D viewer and output the 3D viewing position adjustment information, for each secondary 3D viewer except the primary 3D viewer when there are at least two 3D viewers.

In one embodiment, the 2D viewing position adjustment information may be: the minimum position adjustment distance from which both the left eye and the right eye of the 2D viewer can watch the 2D view. In one embodiment, the 3D viewing position adjustment information may be: the minimum position adjustment distance from which the left eye and the right eye of the secondary 3D viewer can respectively watch the 3D left-eye visual view and the 3D right-eye visual view.

In at least one embodiment, the 2D view and the 3D left-eye visual view or the 3D right-eye visual view may display same image.

Similarly, the display control device can achieve glasses-free 3D display and 2D display at the same time, satisfy the viewing requirements of different viewers, and improve the applicability of the display module.

Figure 4:
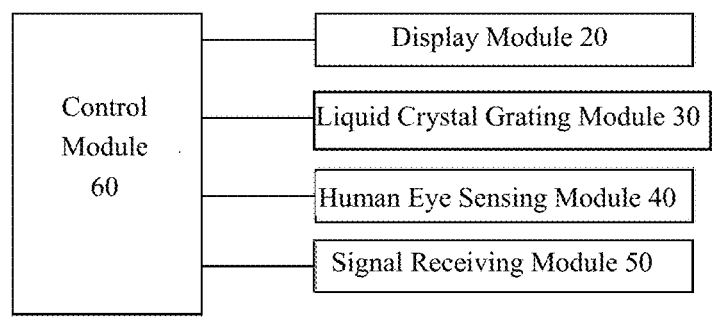
FIG. 4 is a flowchart of a display control system provided by an embodiment of the present invention.

As illustrated in FIG. 4, on the basis of the same invention concept, the display control system provided by at least one embodiment of the present invention comprises: a display module 20; a liquid crystal grating module 30 disposed in front of the display module 20; a signal receiving module 50 configured to receive view type selection signals of viewers; a human eye sensing module 40 configured to detect human eye position information; and a control module 60 in signal connection with the display module 20, the liquid crystal grating module 30, the signal receiving module 50 and the human eye sensing module 40 respectively and configured to allow sub-pixel views, other than a 3D left-eye visual view and a 3D right-eye visual view, of the display module 20 to present same 2D views, and obtain corresponding 2D viewing position adjustment information capable of allowing both a left eye and a right eye of a 2D viewer to watch the 2D view according to eye position information of each 2D viewer and output the 2D viewing position adjustment information.

In at least one embodiment, the 2D view and the 3D left-eye visual view or the 3D right-eye visual view may display same image, so that the 2D viewer and the 3D viewer can view images having same content.

Figure 5:
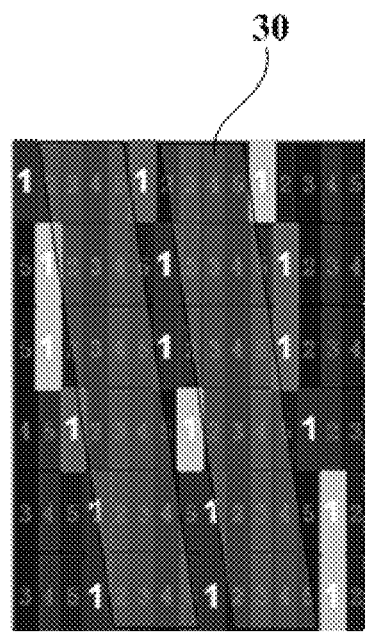
FIG. 5 is a schematic diagram illustrating the arrangement of sub-pixel units by the five-view two-to-nine method.

In the embodiment of the present invention, the specific arrangement mode of the sub-pixel units of the display module 20 is not limited. For instance, as illustrated in FIG. 5, the sub-pixel units of the display module 20 are arranged by a "five-view two-to-nine method"; and the tilt angle of the grating of the liquid crystal grating module 30 is 77.47 or 102.53 degrees. In the five-view two-to-nine method, the image is displayed in the form of five views captured from different angles (the view captured from each angle is represented by a mark in FIG. 5). Taking a view 1 as an example, as illustrated in FIG. 5, supposing the coordinate of the (x)th row and the (y)th column of the view 1 is (x, y), the coordinates of the view 1 are (x, y), (x+1, y+1) and (x+1, y+2); the coordinates of a view 2 are (x+1, y), (x+2, y+1) and (x+2, y+2); the coordinates of a view 3 are (x+2, y), (x+3, y+1) and (x+3, y+2); the coordinates of a view 4 are (x+3, y), (x+4, y+1) and (x+4, y+2); the coordinates of a view 5 are (x+4, y), (x+5, y+1) and (x+5, y+2); and x=1, 3, 5, 7 . . . and y=1, 4, 7, 10 . . . . Due to the action of the grating, each eye of the viewer can only view one view in watching. Thus, each viewer can only view two views (namely a group of views). By adoption of the method, the viewer can view different groups of views when watching at different viewing positions. Based on the practical experience and theoretical analysis, the moiré phenomenon of the pixel arrangement mode is the weakest, and hence better 3D display effect can be obtained.

In at least one embodiment, the control module 60 may also be configured to: determine a primary 3D viewer who is the nearest to the screen center according to eye position information of at least one 3D viewer, and adjust the position of the grating of the liquid crystal grating module 30 according to the eye position information of the primary 3D viewer, so that a left eye and a right eye of the primary 3D viewer can respectively watch the 3D left-eye visual view and the 3D right-eye visual view with maximum brightness.

Figure 6:
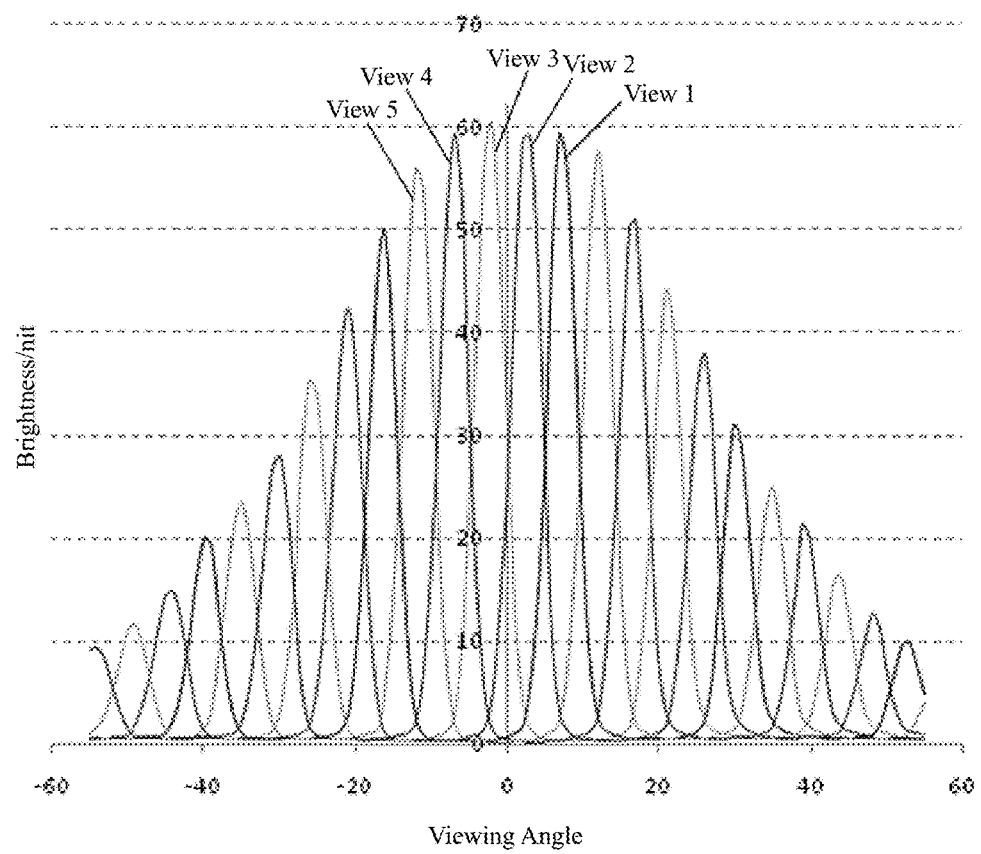
FIG. 6 is a white-light brightness distribution curve of a 3D display module adopting the arrangement mode in FIG. 5.

The 3D display white-bright brightness distribution curve adopting the arrangement mode as shown in FIG. 5 is as shown in FIG. 6. As can be seen, when the 3D viewing position is closer to the screen center, the brightness value of the view is higher. The position of the grating of the liquid crystal grating module 30 is adjusted according to the eye position information of the primary 3D viewer, so that the left eye and the right eye of the primary 3D viewer can respectively watch the 3D left-eye visual view and the 3D right-eye visual view with maximum brightness, namely views close to the zero visual angle as shown in FIG. 6. The primary 3D viewer can watch the views with maximum brightness in the case of watching 3D display, and hence can obtain better 3D visual effect.

In at least one embodiment, the control module 60 may also be configured to obtain corresponding 3D viewing position adjustment information capable of allowing a left eye and a right eye of a secondary 3D viewer to respectively watch the 3D left-eye visual view and the 3D right-eye visual view according to eye position information of the secondary 3D viewer and output the 3D viewing position adjustment information, as for each secondary 3D viewer except the primary 3D viewer when there are at least two 3D viewers. The 3D viewing position adjustment information can guide the secondary 3D viewer to rapidly move to a preferred viewing position, so that the secondary 3D viewer can obtain better 3D viewing effect. The viewing position adjustment information may be outputted to an audio device for voice alarm and may also be outputted to a display device for subtitle or graphic prompts.

Taking the case that the sub-pixel units of the display module are arranged by the "five-view two-to-nine method" as an example, the working process of the glasses-free 3D display control system as shown in FIG. 4 may, for instance, comprise: opening the 3D/2D simultaneous display mode; allowing the human eye sensing module to detect the human eye position information and the signal receiving module to receive the view type selection signal of each viewer; allowing the control module to determine the primary 3D viewer who is the nearest to the screen center according to the eye position information of a plurality of 3D viewers, and adjust the position of the grating of the liquid crystal grating module according to the eye position information of the primary 3D viewer, so that the left eye and the right eye of the primary 3D viewer can respectively watch the 3D left-eye visual view and the 3D right-eye visual view with maximum brightness, namely watch the view 1 and the view 3 with maximum brightness; obtaining corresponding 3D viewing position adjustment information capable of allowing the left eye and the right eye of the secondary 3D viewer to respectively watch the view 1 and the view 3 as shown in FIG. 5 according to the eye position information of the secondary 3D viewer based on the principle of proximity, as for each secondary 3D viewer except the primary 3D viewer, and outputting the 3D viewing position adjustment information to a media device for voice or subtitle and graphic prompts to direct the viewer to find the preferred 3D viewing position; displaying the views 2, 4 and 5 as shown in FIG. 5 to be the same as the view 1 (or the view 3); and obtaining corresponding 2D viewing position adjustment information capable of allowing both the left eye and the right eye of the 2D viewer to watch the 2D view according to the eye position information of each 2D viewer, and outputting the 2D viewing position adjustment information to a media device for voice or subtitle and graphic prompts to direct the viewer to find the preferred 2D viewing position.

In summary, the display control system provided by the embodiment of the present invention can display views, other than the 3D left-eye visual view and the 3D right-eye visual view, to present same 2D views; the 2D viewing position adjustment information can guide the 2D viewer to move to the preferred 2D viewing position; and the system can achieve glasses-free 3D display and 2D display at the same time, satisfy the viewing requirements of different viewers, and improve the applicability of the display module.

Obviously, various modifications and deformations can be made to the present invention by those skilled in the art without departing from the spirit and scope of the present invention. Therefore, if the modifications and deformations of the present invention fall within the scope of the appended claims of the present invention and equivalents thereof, the present invention is also intended to include the modifications and deformations.

The application claims priority to the Chinese patent application No. 201410235996.4 submitted on May 29, 2014. The disclosure content of the Chinese patent application is incorporated by reference herein as part of the application.

The invention claimed is:
1. A display control method, comprising:
allowing sub-pixel views, other than a 3D left-eye visual view and a 3D right-eye visual view, of a display module to display a same 2D view;
obtaining corresponding 2D viewing position adjustment information capable of allowing both a left eye and a right eye of a 2D viewer to watch the 2D view according to eye position information of each 2D viewer, and outputting the 2D viewing position adjustment information;
determining a primary 3D viewer who is the nearest to the screen center according to eye position information of at least one 3D viewer; and
adjusting a position of a grating of a liquid crystal grating module according to the eye position information of the primary 3D viewer, so that a left eye and a right eye of the primary 3D viewer can respectively watch the 3D left-eye visual view and the 3D right-eye visual view with maximum brightness,
wherein the 2D viewing position adjustment information is: a minimum position adjustment distance from which both the left eye and the right eye of the 2D viewer can watch the 2D view,
there are at least two 3D viewers, as for each secondary 3D viewer except the primary 3D viewer, the method further comprises:
obtaining corresponding 3D viewing position adjustment information capable of allowing a left eye and a right eye of the secondary 3D viewer to respectively watch the 3D left-eye visual view and the 3D right-eye visual view according to eye position information of the secondary 3D viewer, and outputting the 3D viewing position adjustment information, and
wherein the 3D viewing position adjustment information is: a minimum position adjustment distance from which the left eye and the right eye of the secondary 3D viewer can respectively watch the 3D left-eye visual view and the 3D right-eye visual view.

2. The display control method according to claim 1, wherein the 2D view and the 3D left-eye visual view or the 3D right-eye visual view display a same image.

3. A display control device, comprising:
a display operative to allow sub-pixel views, other than a 3D left-eye visual view and a 3D right-eye visual view, of a display panel to display a same 2D view;
a controller being in signal connection with the display and operative to:
obtain corresponding 2D viewing position adjustment information capable of allowing both a left eye and a right eye of a 2D viewer to watch the 2D view according to eye position information of each 2D viewer and output the 2D viewing position adjustment information;
determine a primary 3D viewer who is the nearest to a screen center according to eye position information of at least one 3D viewer;
adjust a position of a grating of a liquid crystal grating panel according to the eye position information of the primary 3D viewer, so that a left eye and a right eye of the primary 3D viewer can respectively watch the 3D left-eye visual view and the 3D right-eye visual view with maximum brightness; and
obtain corresponding 3D viewing position adjustment information capable of allowing a left eye and a right eye of a secondary 3D viewer to respectively watch the 3D left-eye visual view and the 3D right-eye visual view according to eye position information of the secondary 3D viewer and outputting the 3D viewing position adjustment information, as for each secondary 3D viewer except the primary 3D viewer when there are at least two 3D viewers, wherein the 2D viewing position adjustment information is: a minimum position adjustment distance from which both the left eye and the right eye of the 2D viewer can watch the 2D view, and wherein the 3D viewing position adjustment information is: a minimum position adjustment distance from which the left eye and the right eye of the secondary 3D viewer can respectively watch the 3D left-eye visual view and the 3D right-eye visual view.

4. The display control device according to claim 3, wherein the 2D view and the 3D left-eye visual view or the 3D right-eye visual view display a same image.

5. A display control system, comprising:
a display panel;
a liquid crystal grating panel disposed in front of the display panel;
a signal receiver operative to receive view type selection signals of viewers; and
a human eye sensor operative to detect human eye position information;
a controller being in signal connection with the display panel, the liquid crystal grating panel, the signal receiver and the human eye sensor respectively and operative to
allow sub-pixel views, other than a 3D left-eye visual view and a 3D right-eye visual view, of the display panel to display a same 2D view;
obtain corresponding 2D viewing position adjustment information capable of allowing both a left eye and a right eye of a 2D viewer to watch the 2D view according to eye position information of each 2D viewer and output the 2D viewing position adjustment information;
determine a primary 3D viewer who is the nearest to a screen center according to eye position information of at least one 3D viewer;
adjust a position of a grating of a liquid crystal grating panel according to the eye position information of the primary 3D viewer, so that a left eye and a right eye of the primary 3D viewer can respectively watch the 3D left-eye visual view and the 3D right-eye visual view with maximum brightness; and
obtain corresponding 3D viewing position adjustment information capable of allowing a left eye and a right eye of a secondary 3D viewer to respectively watch the 3D left-eye visual view and the 3D right-eye visual view according to eye position information of the secondary 3D viewer and output the 3D viewing position adjustment information, as for each secondary 3D viewer except the primary 3D viewer when there are at least two 3D viewers, wherein the 2D viewing position adjustment information is: a minimum position adjustment distance from which both the left eye and the right eye of the 2D viewer can watch the 2D view, and wherein the 3D viewing position adjustment information is: a minimum position adjustment distance from which the left eye and the right eye of the secondary 3D viewer can respectively watch the 3D left-eye visual view and the 3D right-eye visual view.

6. The display control system according to claim 5, wherein the 2D view and the 3D left-eye visual view or the 3D right-eye visual view display a same image.

7. The display control system according to claim 6, wherein sub-pixel units of the display panel are arranged by a five-view nine-second method; and a tilt angle of the grating of the liquid crystal grating panel is 77.47 or 102.53 degrees.

* * * * *